Figure 1:
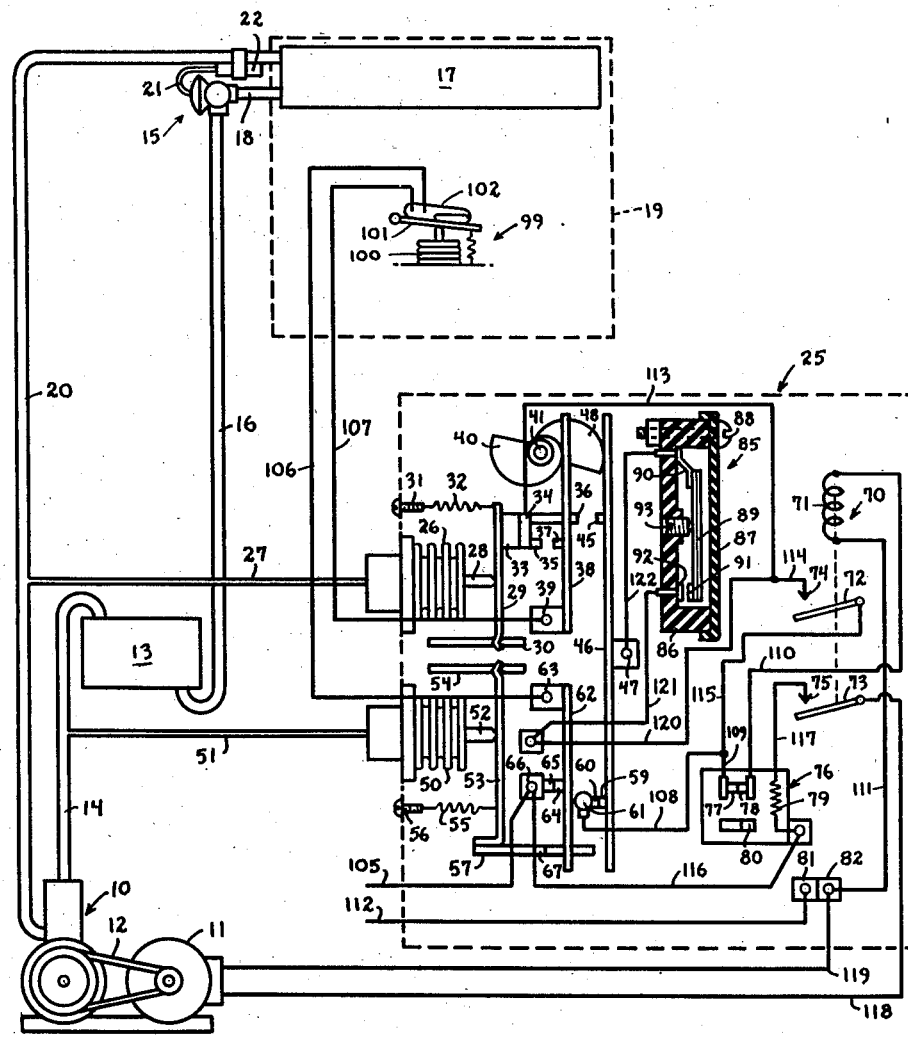

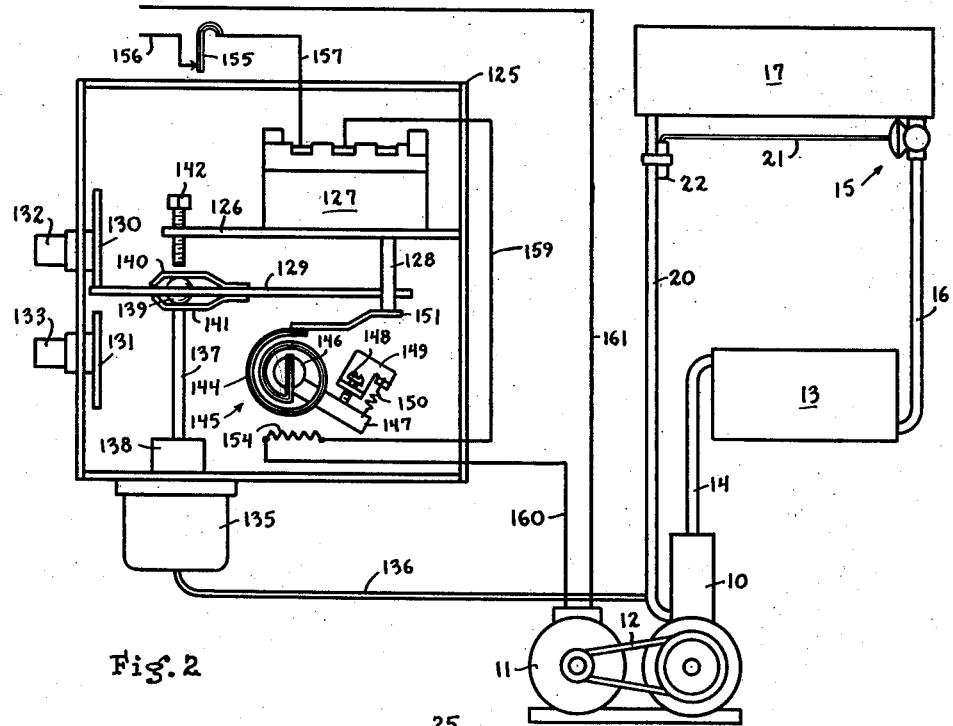
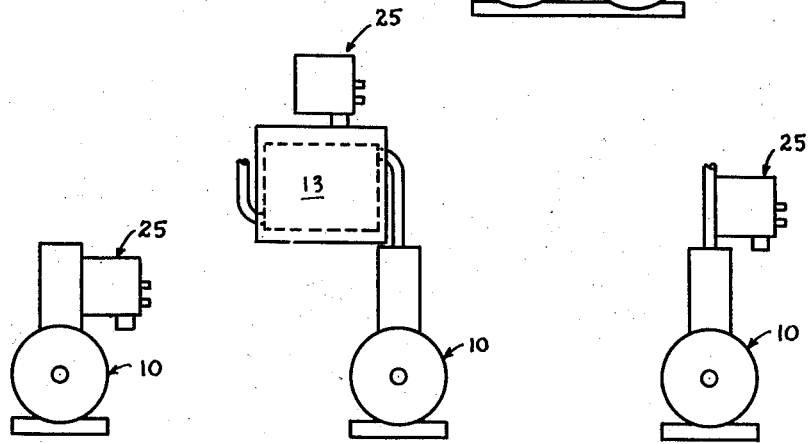
Fig. 3  Fig. 4  Fig. 5
INVENTOR
Alwin B. Newton
BY
George H. Fisher
ATTORNEY Jan. 16, 1945.  A. B. NEWTON  2,367,306
CONTROL FOR REFRIGERATING APPARATUS
Filed Aug. 1, 1941  3 Sheets-Sheet 3

INVENTOR
Alwin B. Newton
BY
George H. Fisher
ATTORNEY

Patented Jan. 16, 1945

2,367,306

UNITED STATES PATENT OFFICE 2,367,306

CONTROL FOR REFRIGERATING APPARATUS

Alwin B. Newton, Minneapolis, Minn., assignor to Minneapolis-Honeywell Regulator Company, Minneapolis, Minn., a corporation of Delaware Application August 1, 1941, Serial No. 405,032

11 Claims. (Cl. 62—4)

The invention herein disclosed relates primarily to controls for refrigerating systems, particularly, systems having a compressor, condenser and an evaporator connected in operative circuit relationship.

One of the main objects of the invention is to provide an improved arrangement for controlling the compressor wherein the compressor is normally started in response to suction pressure but wherein there are means for starting the compressor in response to ambient temperature, the latter means being arranged to be affected by heat generated as an incident to operation of the system for retracting it from compressor starting position.

Another object is to make the temperature responsive means in the form of a timer so as to remain out of starting position of the compressor for a predetermined time to prevent it from causing short cycling of the compressor.

The ambient temperature responsive means of the foregoing objects is particularly advantageous and desirable where the compressor is located in a relatively cold location such that the suction pressure might not rise high enough to cause the compressor to start. The heat applied to the ambient temperature responsive means causes it to move out of starting position of the compressor and to remain out of that position for a predetermined time. The controller embodying the ambient temperature responsive means may be disposed adjacent the compressor or condenser, to be heated thereby or in fulfilling another object of the invention the necessary heat may be obtained from an electric heater.

Another object is to provide a control device, preferably a switch, for refrigerant compressors which is normally actuated by evaporator pressure or temperature but which may be actuated by an ambient temperature responsive thermostat, the latter embodying strain release means so as not to interfere with operation of the switch by evaporator pressure or temperature.

Another object is to provide a control device, preferably a switch, responsive to pressure and having bi-metal means for compensating it for ambient temperature.

Another object is to provide a compressor control arrangement comprising a switch which may be moved to "on" position in response to evaporator temperature or pressure provided a thermostat in the refrigerated space is calling for cooling, the thermostat having a heater which heats the thermostat when it is satisfied to cause it to periodically cycle on and off so that opportunity is provided for the switch to be closed by evaporator pressure or temperature at frequent intervals, the purpose of the arrangement being to provide for more uniform cycling operation.

Figure 6:
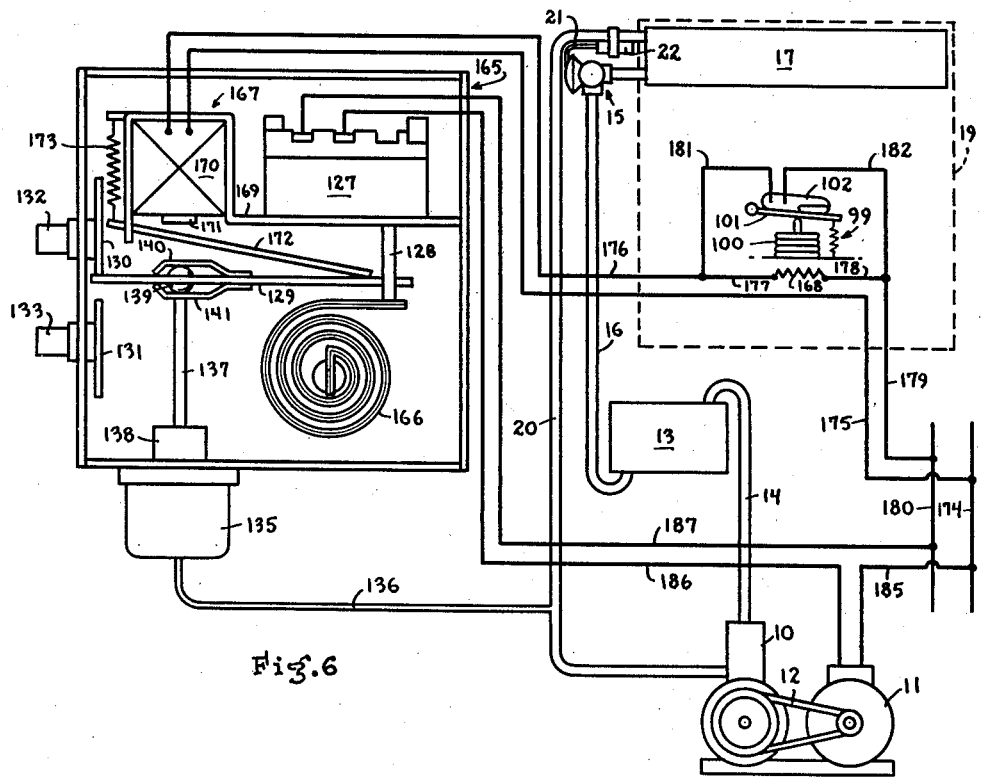
Figure 7:
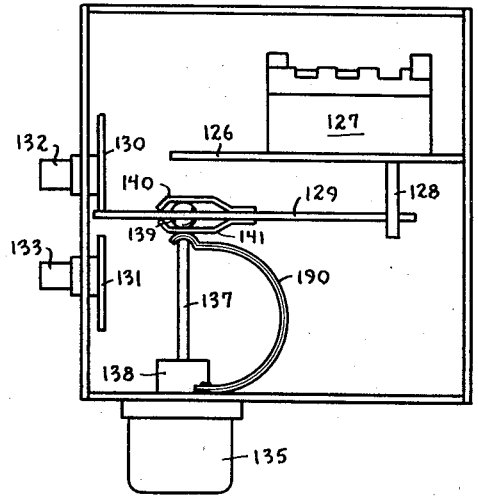

Figure 1 represents a refrigerating system controlled by a controller embodying the ambient temperature responsive means of my invention therein, Figure 2 represents a refrigerating system controlled by a different form of controller embodying my invention, Figure 3 represents a compressor having the controller of my invention mounted on the cylinder thereof, Figure 4 represents a compressor and condenser with the controller mounted on the condenser, Figure 5 represents a compressor with the controller mounted on the discharge of the compressor, Figure 6 represents a refrigerating system embodying a form of the controller of my invention having additional means responsive to the temperature of the refrigerated space, and Figure 7 represents a control switch having means for compensating the switch for ambient temperature.

Referring to Figure 1 of the drawings, numeral 10 represents the compressor of a compression type refrigerating system. The compressor is driven by an electric motor 11 by means of a belt 12. The discharge side of the compressor is connected to a condenser 13 by means of a pipe 14, and the condenser is connected to an expansion valve 15 by means of a pipe 16. The outlet of the expansion valve 15 is connected to an evaporator 17 by means of a pipe 18. The evaporator 17 is disposed in a compartment to be refrigerated, the compartment being represented by the broken lines 19. The outlet of the evaporator is connected to the suction side of the compressor by a pipe 20.

The expansion valve 15 is a conventional type adapted to maintain a predetermined number of degrees of superheat of the refrigerant in the outlet of the evaporator, the valve having a pressure chamber connected by a capillary tube 21 to a thermostatic bulb 22 disposed in intimate heat exchange relation with the outlet of the evaporator.

The compressor motor 11 is controlled primarily by a controller 25 which is essentially the same as the controller disclosed in detail in the application of Judson and Kronmiller, Serial No. 196,447, filed March 17, 1938. This application became Patent No. 2,244,783 on June 10, 1941.

The controller 25 operates jointly in response to head pressure and suction pressure. The controller comprises a generally rectangular casing within which is mounted an expansible and contractible bellows 26 which is connected to the suction pipe 20 by a tube 27 so as to expand and contract in accordance with changes in suction pressure. At the movable end of the bellows 26 is a stem 28 which engages an intermediate portion of a lever 29, the lower end of which is crimped as shown and which normally engages a knife edge on a fixed member 30, the lever 29 being operable to pivot about the knife edge. The upper end of the lever 29 is attached to an adjusting screw 31 extending through a sidewall of the casing of the controller 25 by means of a tension spring 32 which normally urges the lever 29 against the stem 28. The lever 29 carries an insulating member 33 and mounted on this insulating member is a contact bracket 34 carrying an electrical contact 35 and another electrical contact 36. The contact 35 cooperates with a contact 37 carried on a flexible bracket 38 mounted within the controller 25, the mounting means forming an electrical terminal 39. The upper end of bracket 38 engages a cam 40 which acts as a stop, the cam having a gradually rising surface as shown and being mounted on a shaft 41 which extends to the exterior of the casing of the controller 25 so that the cam can be adjusted from outside the controller. The contact 36 cooperates with a contact 45 carried on a contact bracket 46 which is mounted within the casing of the controller, the mounting means forming an electrical terminal 47. The upper end of the bracket 46 engages a cam 48 similar to the cam 40 and which is also mounted on a separate shaft rotatable from outside the controller 25 for adjusting the cam which acts as a stop for the bracket member 46.

When the suction pressure rises, the bellows 26 expands moving the lever 29 in a clockwise direction causing contact 35 to be brought into engagement with contact 37 and causing contact 36 to engage contact 45 later at a higher suction pressure which may be a pressure corresponding to a temperature of 33° F. of the refrigerant in the system. As will presently be described, the compressor is not started in operation until contact 36 engages contact 45, and inasmuch as this does not occur until the pressure of the refrigerant has risen to a value corresponding to a temperature of the refrigerant above freezing, the evaporator must defrost before the compressor can be started after the termination of the preceding cycle. When the compressor is started, the suction pressure falls, causing the bellows 26 to contract permitting lever 29 to move in a counter-clockwise direction. When this occurs contact 36 first disengages from contact 45, and at a lower suction pressure contact 35 disengages from contact 37 and this may occur, for example, at a relatively low evaporator pressure corresponding to a temperature of the refrigerant of 15°, for example. As will presently be pointed out, the compressor is not stopped until contacts 35 and 37 are disengaged. By adjusting the cams 40 and 48, the positions of the brackets 38 and 46 can be adjusted, and consequently the positions of contacts 37 and 45 can be adjusted with respect to their associated contacts to thereby adjust the suction pressures at which the contacts engage and disengage. Obviously by reason of the separate cams and contact brackets, the cut-in and cut-out pressures can be separately adjusted.

Numeral 50 designates a second expansible and contractible bellows within the casing of controller 25, this bellows being connected to the discharge pipe of the compressor by a tube 51. At the movable end of bellows 50 is a stem 52 which normally engages an intermediate point of lever 53, the upper end of which is crimped and which engages a knife edge formed on a fixed member 54. The lever 53 is adapted to pivot about the knife edge on member 54 and it is normally urged in a clockwise direction into engagement with stem 52 by a coil spring 55 attached to a screw 56 extending through a sidewall of the casing of controller 25 and adjustable from outside the casing for adjusting the tension of the spring. The lower end of lever 53 carries a pusher 57 arranged to engage the lower end of contact bracket 46 when the bellows 50 expands, the contact bracket 46 extending below the terminal 47. Adjacent the lower end of bracket 46 is a contact 59 which is normally in engagement with a contact 60 on an electrical terminal post 61. Numeral 62 designates a contact bracket mounted within the casing of controller 25, the mounting means forming an electrical terminal 63. The bracket 62 carries a contact 64 which is normally in engagement with a contact 65 carried on an electrical terminal 66.

The pusher 57 has a shoulder 67 arranged to engage the lower end of bracket 62 when the bellows 50 expands moving the pusher 57 to the right. The purpose of the bellows 50 and its associated contacting arrangement is to prevent the compressor from being started at too high a head pressure such as would be apt to overload the compressor motor as will presently be described. When the head pressure rises, the bellows 50 expands moving the lever 53 in a counter-clockwise direction moving the pusher 57 to the right. When the head pressure rises to 140 pounds, for example, the end of pusher 57 engages the lower end of bracket 46 causing contact 59 to disengage from contact 60. If the head pressure continues to rise, upon further movement of pusher 57 to the right, at a somewhat higher head pressure which may be 180 pounds, for example, the shoulder 67 engages the lower end of bracket 62 causing contact 64 to be disengaged from contact 65. As will presently be described, in order for the compressor motor to be started, the head pressure must have fallen to 140 pounds, but after it has been started it can be continued in operation provided the head pressure does not rise above 180 pounds.

Included within the casing of controller 25 is a relay designated by the numeral 70. The relay 70 comprises a winding 71 having an armature associated therewith which is attached to movable switch blades 72 and 73, the switch blades cooperating with fixed electrical contacts 74 and 75 respectively. When the winding 71 of the relay is energized the armature is moved in a direction to move the switch blades into engagement with their associated fixed contacts. Also mounted within the casing of the controller 25 is an overload device designated by the numeral 76 which may be of a conventional type. The overload device comprises a pair of contacts 77 and 78 which are disposed in the relay circuit, as will presently be described, and which are actuatable by a heat responsive device responsive to heat generated by an electric heater 79 in the form of a resistance connected in the load circuit, that is, in the compressor motor circuit. The overload device 76 may have a manual lever

80 for resetting it to closed position after it is opened in response to an overload. Numerals 81 and 82 designate a pair of electrically connected terminals within the casing of controller 25.

Under some circumstances the compressor of the system may be located in a relatively cold location, such that the suction pressure might not at times rise to a high enough value to cause closure of contacts 36 and 45 to bring about starting of the compressor motor. To insure that the compressor motor may be started under such circumstances, I have provided an additional temperature responsive device responsive to the temperature in the vicinity of the compressor for starting the compressor motor even though the suction pressure does not rise high enough to close contacts 36 and 45. The temperature responsive device is mounted within the casing of controller 25 and is designated generally by the numeral 85. It comprises a housing 86 which may be made of suitable composition, the housing having a cover 87 which may be secured to the housing by means of a bolt 88. Within the housing is a bimetal temperature responsive element 89 carried by bracket 90. At one end of element 89 is an electrical contact 91 cooperating with a fixed contact 92 within the housing 86. Contacts 91 and 92 control a branch circuit arranged in parallel with contacts 36 and 45. Bearing against an intermediate point of the element 89 is a screw 93 adjustable from outside of the housing 86 for adjusting the spacing of contacts 91 and 92 to adjust the temperature at which the contacts will be brought into engagement. Upon a fall in temperature the lower portion of element 89 warps to the left and normally screw 93 is so adjusted that contacts 91 and 92 will be brought into engagement at a temperature of 40° F., for example. It will be understood that the controller 25 as a whole is mounted in the vicinity of the compressor so that the element 89 is responsive to the ambient temperature around the compressor. When the compressor has been started by the device 85, it may be kept in operation by other parts of the control mechanism and it is not desired that the compressor operate for a short period and then be immediately restarted by the device 85. Thus, after the device 85 has closed its contacts for starting the compressor, it is desirable that the element 89 disengage contact 91 from contact 92 relatively soon and maintain the contacts separated for a relatively long period of time, for example, an hour. Thus I have constructed and arranged device 85 so as to act as a timer to maintain the contacts open for perhaps an hour after they have been closed to start the compressor. The device 85 as previously pointed out is mounted within the casing of the controller 25. When the relay 70 is energized (energization of the relay causing operation of the compressor, as will presently be pointed out), its winding 71 generates a certain amount of heat as does the heater 79 of the overload device 76. The element 89 of the device 85 and the other elements of the controller 25 have considerable thermal mass, and after it has closed the contacts 91 and 92, the heat generated within the controller 25 will cause the element 89 to warp in a direction to separate the contacts, and due to the mass of the controller it will accumulate a considerable amount of the heat generated within the controller and this heat will maintain the device 85 in open position of its contacts for a period of an hour, for example, after the compressor has been stopped and there is no further generation of heat within the controller 25, the timed period of course depending on the ambient temperature around the controller. After the one hour period, reclosure of contacts 91 and 92 will depend on the ambient temperature falling below 40° F.

To provide the necessary heating for opening contacts 91 and 92 and maintaining them open for a timed period, the controller 25 may be mounted in a position to be affected by heat generated by the refrigerating system. For instance, in Figure 3 there is shown a compressor with the controller 25 of Figure 1 mounted on the compressor cylinder to be heated thereby. Figure 4 shows a compressor and a condenser with the controller 25 mounted on the condenser so as to derive heat from the condenser. Figure 5 shows a compressor with the controller 25 of Figure 1 mounted on the discharge of the compressor.

The bimetal element 89 is so constructed that after the compressor has been started the heat generated either by the controller itself, or by the compressor, or at the condenser will be sufficient to cause the element to open its contacts after approximately one minute.

While such arrangemens have not been shown, the controller may also be mounted directly on the motor, or if an air cooled condenser is used, the controller may be mounted in the stream of warm air passed over the condenser.

It will be understood of course that when the compressor is started in operation the ambient temperature surrounding it will rise, and this rise in temperature will also tend to keep the device 85 in open position. Of course after the compressor has stopped and after the expiration of the timing period, the ambient temperature will have fallen back to normal, and as pointed out above reclosure of contacts 91 and 92 will depend upon the ambient temperature falling below 40° F.

The controls for the compressor motor include a thermostat 99 in the refrigerated compartment 19. The thermostat 99 comprises an expansible and contractible bellows 100 having a stem engaging a pivoted lever 101. The lever 101 carries a mercury switch 102 having electrodes at its left end. When the temperature in the refrigerated compartment rises to a predetermined value, which may be 42° F. for example, the bellows 100 expands moving the lever 101 in a counterclockwise direction causing closure of mercury switch 102. As will presently be explained, the mercury switch 102 must be closed in order to start the compressor motor. When the temperature in the refrigerated compartment falls to 40° F., bellows 100 contracts sufficiently to move lever 101 in a clockwise direction into a position wherein mercury switch 102 is opened. In other words, the thermostat 99 has a differential of 2° F.

In normal operation, the compressor motor 11 will be started when the mercury switch 102 closes indicating a need for refrigeration in the compartment 19, provided all of the contacts responsive to suction and head pressure within the controller 25 are closed. In other words, the head pressure must be below 140 pounds to prevent overloading of the compressor motor upon starting and the suction pressure must have risen to a value high enough to have caused defrosting of the evaporator. When the above conditions prevail a circuit is completed for the relay 70 as follows: from wire 105 to terminal 66 through contacts 65 and 64, contact bracket 62, terminal 63, wire 106, mercury switch 102, wire 107, terminal 39, contact bracket 38, contacts 37 and 35, contact bracket 34, contacts 36 and 45, contact bracket 46, contacts 59 and 60, terminal 61, wire 108, wire 109, contacts 77 and 78, wire 110, winding 71, wire 111, terminals 82 and 81 to wire 112. The wires 105 and 112 may be connected to any suitable source of power not shown. When the winding 71 of relay 70 is thus energized the switch blades 72 and 73 are moved into engagement with their respective contacts. Engagement of blade 72 with contact 74 completes a maintaining circuit for relay winding 71 which by-passes suction pressure contacts 36 and 45 and head pressure contacts 59 and 60 so that after the relay is energized it will be kept energized through the maintaining circuit even though the suction pressure falls below the value at which contacts 36 and 45 close and even though the head pressure rises above 140 pounds. The maintaining circuit is as follows: from wire 105 to terminal 66, contacts 65 and 64, contact bracket 62, terminal 63, wire 106, mercury switch 102, wire 107, terminal 39, contact bracket 38, contacts 37 and 35, contact bracket 34, wire 113, wire 114, contact 74, switch blade 72, wire 115, wire 109, contacts 77 and 78, wire 110, winding 71, wire 111, terminals 82 and 81 back to wire 112.

Engagement of switch blade 73 with contact 75 completes a circuit energizing the compressor motor as follows: from wire 105 to terminal 66, wire 116, to overload heater 79, wire 117, contact 75, switch blade 73, wire 118, compressor motor 11, wire 119, terminals 82 and 81 back to wire 112. The relay 70 remains energized keeping the compressor in operation until either the suction pressure falls to the value at which contacts 35 and 37 open so as to interrupt the above described maintaining circuit or until the said maintaining circuit is interrupted by opening of mercury switch 102 in the event of thermostat 99 becoming satisfied. The maintaining circuit may also be interrupted in the event that head pressure rises above 180 pounds causing contacts 64 and 65 to become separated. Normally, however, the relay 70 will be deenergized to terminate an operating cycle either in response to suction pressure or in response to the thermostat 99.

As pointed out above, under some circumstances when the compressor is in a relatively cold location wherein the suction pressure might not rise high enough to cause contacts 36 and 45 to close for energizing the relay, it is necessary to rely on other means for causing the compressor motor to start. As pointed out above, the controller 25 is located in the vicinity of the compressor so that the device 85 is responsive to the ambient temperature surrounding the compressor, and this device is set to normally close its contacts at a temperature of 40° F., this temperature being exemplary of one below which the air surrounding the compressor would be so cold that the suction pressure would not rise high enough to close contacts 36 and 45. When the device 85 closes its contacts, a circuit is completed which energizes the relay 70, this circuit by-passing contacts 36 and 45 and being as follows: from wire 105 to terminal 66, contacts 65 and 64, contact bracket 62, terminal 63, wire 106, mercury switch 102, wire 107, terminal 39, contact bracket 38, contacts 37 and 35, contact bracket 34, wire 113, wire 120, wire 121, contacts 92 and 91, element 89, wire 122, terminal 47, contact bracket 46, contacts 59 and 60, terminal 61, wire 108, wire 109, contacts 77 and 78, wire 110, winding 71, wire 111, terminals 82 and 81 back to wire 112. Completion of this circuit energizes relay 70 causing starting of the compressor motor, as described above, and also causing completion of the above described maintaining circuit through the thermostat 99, it being understood, of course, from the circuit just described, that the thermostat 99 must be in a position demanding refrigeration in order for the device 85 to start the compressor motor.

When the relay is energized and the compressor motor started the heat generated by the heater 79 and the relay winding are sufficient to cause the element 89 to separate the contacts 91 and 92 substantially one minute after they have closed. Or if the controller 25 is mounted in one of the positions previously described, the heat from the compressor or condenser serves to cause the device 85 to open its contacts. After the device 85 opens its contacts, the compressor motor is kept in operation, however, through the maintaining circuit and it will continue to operate until the maintaining circuit is interrupted either by the suction pressure opening contacts 35 and 37 or the temperature in the refrigerated compartment causing the thermostat 99 to become satisfied. While the compressor is in operation, the controller 25 accumulates additional heat tending to keep contacts 91 and 92 separated. As before, of course, the maintaining circuit may be opened by reason of the head pressure rising above 180 pounds. Thus after the compressor motor has been started by the device 85 it will operate for a length of time depending both upon what the suction pressure was at the time the compressor was started and upon the temperature in the refrigerated space. If the suction pressure has risen only slightly above the value at which contacts 35 and 37 closed at the time the compressor motor is started in response to the device 85, the compressor motor will be operated only for a very short time, that is, until the suction pressure is reduced sufficiently to open the contacts 35 and 37.

After the compressor motor has been started by the device 85 and has then been stopped by one of the other control means, it is not desired that the compressor motor be started to recycle the system immediately or after a very short delay. Therefore the device 85 has the function of a timing device so that its contacts will not become closed for a period of substantially an hour after the compressor motor has been stopped. During the time that the compressor motor is operating, the controller 25 will accumulate a certain amount of heat which is generated within the controller 25 or as has already been described this heat may be provided by the compressor motor or condenser when the controller 25 is mounted in one of the positions shown in Figs. 3 to 5. The heat which the various parts of the controller will absorb is sufficient to raise its temperature a given amount, and after the compressor motor has been stopped and the air in the vicinity of the compressor cools back to normal substantially one hour of time will be required for the controller 25 to dissipate its accumulated heat and to permit element 89 to again respond normally to the normal ambient temperature surrounding the compressor. Thus, the arrangement provides for starting the compressor motor even though the normal control responsive to suction pressure will not do so. Short and frequent cycles are prevented by reason of the timing function which the device 85 has which provides for substantially an hour's delay after stopping of the compressor motor before it can again be started by the device 85.

Those skilled in the art will appreciate the advantages of my improved arrangement inasmuch as it insures starting of the compressor motor when necessary but will not start the compressor motor at other times. The device utilized is very simple in construction and utilizes heat already available in the system.

The invention may be carried out by closing contacts 91 and 92 by means of a thermal bulb and bellows arrangement, the bulb being mounted on the compressor discharge pipe or other place where it will be heated when the system is in operation.

Referring to Figure 2 of the drawings, I have shown a refrigeration system which is the same as the one disclosed in Figure 1, this system being provided with a different form of controller embodying the compressor starting means of my invention, that is, the means responsive to the ambient temperature around the compressor. In Figure 2 the system itself is the same as in Figure 1 and the elements thereof are numbered the same.

The controller of Figure 2 comprises a casing 125 having a horizontal shelf 126 therein and mounted on the shelf 126 is a snap switch generally designated by the numeral 127, the snap switch being enclosed within a Bakelite housing and being of the same type as disclosed in detail in the application of A. E. Baak, Serial No. 307,991, filed December 7, 1939. The switch 127 has "on" and "off" positions and is of the type adapted to remain in the position to which it is operated, the switch having a downwardly extending operating stem designated by the numeral 128. Numeral 129 designates an operating lever, the right end of which engages in a slot in the stem 128 and the left end of which is disposed between two cams 130 and 131 which act as stops for the lever 129. The cam 130 has a generally rising contour and is mounted on a shaft extending through a sidewall of the casing 125, the shaft being rotatable by knob 132 outside of the casing for adjusting the position of the cam. The cam 131 similarly has a generally rising contour and this cam also is mounted on a shaft which extends through a sidewall of the casing of the controller 125, this shaft being rotatable by knob 133 outside of the controller for adjusting the position of cam 131.

Numeral 135 designates a housing attached to the exterior of the casing of controller 125, there being an expansible and contractible bellows within the housing 135. The interior of the bellows is connected to the suction pipe 20 of the compressor by a tube 136. The movable end of the bellows is connected to an operating stem 137 which extends through a fitting 138 into the interior of the casing of controller 125 and the end of the stem 137 carries a ball 139 disposed loosely in an opening at an intermediate point in the lever 129. Numeral 140 designates a leaf spring attached to the upper side of lever 129 and engaging the ball 139. Numeral 141 designates a similar leaf spring attached to the lower side of lever 129 and also engaging the ball 139, the stem 137 passing through the leaf spring 141. The leaf springs 140 and 141 by reason of their engagement with the ball 139 provide a strain release connection between the stem 137 and the lever 129 to permit relative movement between the stem 137 and lever 129.

Numeral 142 designates a screw extending through the shelf 126 above the lever 129 and directly in line with the stem 137. The strain release mechanism comprising the leaf spring 140 normally does not engage the screw 142 in operation. The purpose of the screw will presently be described.

In normal operation the switch 127 may be opened and closed in response to changes in suction pressure. Thus, upon a rise in suction pressure the bellows within housing 135 is expanded against the force of a spring included in the bellows assembly causing the stem 137 to be moved upwardly until the left end of lever 129 engages the cam 130. This occurs at a predetermined relatively high suction pressure which is normally one high enough to insure that the evaporator has defrosted, and when this occurs the lever 129 pivots in a counter-clockwise direction about the cam 130 as a fulcrum moving the stem 128 upwardly, which movement closes the switch 127. When the switch 127 closes, a circuit is completed to the compressor motor, as will presently be described, for starting the compressor motor which causes the suction pressure to fall. The point in the movement of stem 137 at which the end of lever 129 engages cam 130 and thus the pressure at which switch 127 is closed may be adjusted by adjusting the cam 130. This of course following from the fact that the cam 130, as pointed out above, has a gradually rising surface.

When the suction pressure falls, the bellows within housing 135 collapses moving lever 129 downwardly until its left end engages cam 131. This occurs at a predetermined relatively low suction pressure determined by the adjustment of cam 131, and when it does occur the lever 129 is moved in a clockwise direction moving the operating stem 128 downwardly and opening the switch 127. The point in the movement of stem 137 at which the lever 129 engages cam 131 and consequently the pressure at which switch 127 is opened is adjustable by adjusting the cam 131, the cam having a gradually rising surface as pointed out above.

The strain release connection between the stem 137 and the lever 129 provides a release for the force exerted by the bellows if the bellows should continue to expand or contract after the end of the lever 129 has engaged one of the cams and has thereby operated the switch 127.

As in the previous embodiment of the invention, the compressor may be located in a locality wherein the temperature is so low that the suction pressure may not rise high enough to cause closure of the switch 127 for starting the compressor. To insure that the switch 127 will be closed when there is a need for refrigeration even though the suction pressure does not rise high enough to close the switch, I have provided a thermostatic device generally designated at 145. The device 145 comprises a coiled bimetal element 144, the inner end of which is attached to a rotatable pin 146 carrying an arm 147. The arm 147 is normally urged into engagement with a screw 148 carried by a bracket 149 by means of a coil spring 150. The other end of the element 144 carries a finger 151 adapted to engage the end of the operating stem 128. The element 144 contracts upon rising temperature, and when the temperature in the vicinity of the compressor is high enough so that the switch 127 can be closed by suction pressure, for example, when the temperature is above 50° F., the finger 151 normally does not engage the stem 128. When the temperature in the vicinity of the compressor falls so low however, that suction pressure does not rise high enough to close the switch 127, for instance, when the temperature surrounding the compressor falls into a range of from 35° F. to 50° F., for example, the element 144 will expand, moving finger 151 into engagement with the stem 128 and at a predetermined temperature moving the stem upwardly so as to close the switch 127 for starting the compressor. When the finger 151 is thus engaging the stem 128 the switch 127 may be opened in response to suction pressure at substantially the same value as normally by reason of the strain release arrangement formed by the arm 147 and spring 150. Thus, if finger 151 is engaging the stem 128, the stem 128 may be moved downwardly by the lever 129 in response to a fall in suction pressure. When this occurs the stem 128 moves the finger 151 downwardly, and under these circumstances bodily rotating the element 144 and arm 147 against the force of spring 150. The force exerted by spring 150 is relatively small and does not add appreciably to the downward force which the right end of lever 129 must exert to move the stem 128 downwardly for opening switch 127. The forces required to actuate switch 127 are relatively small, and of course when the device 145 closes the switch 127 the force exerted by finger 151 against the stem 128 is less than the force exerted by spring 150, the arm 147 under these circumstances remaining in engagement with the screw 148.

The device 145 may, if desired, be formed and arranged to act as a timer as in the previous embodiment. Thus the controller 125 may be mounted in any of the positions shown in Figures 3 to 5 so that when the compressor is started the element 144 will be heated so as to move finger 151 out of engagement with stem 128. In those forms of my invention wherein the device 145 is constructed to act as a timer as well, the controller has enough thermal mass so as to accumulate a certain amount of heat while the compressor is operating. This heat raises the temperature of the controller a given amount and after the compressor has stopped and the air in the vicinity thereof cools to its normal value substantially an hour, for example, is required for it to dissipate its accumulated heat and to again respond normally to ambient temperature.

If it is not desired to mount the controller 125 in any of the positions shown in Figures 3 to 5, an auxiliary heater 154 may be provided to heat the element 144 when the switch 127 is closed. The heater 154 is connected in series with the switch 127 as will presently be described so as to cause the device 145 to be heated during the time that the compressor is in operation.

Numeral 155 designates a thermostat of the "on" and "off" type which is located in the compartment to be refrigerated and which closes its contacts at a predetermined value of temperature in the refrigerated compartment, these contacts being in series with the switch 127.

In normal operation the compressor motor is started when the thermostat 155 has its contacts closed indicating a need for refrigeration, and when the switch 127 is closed in response to suction pressure in the manner above described. When this occurs, a circuit for the compressor motor 11 is completed as follows: from wire 156 to thermostat 155, wire 157 to a terminal of switch 127, through switch 127 to its other terminal, wire 159, heater 154, wire 160, motor 11 to wire 161, the wires 156 and 161 being connected to any suitable source of power not shown. When the compressor motor is started the suction pressure falls and the motor operates until the above described circuit is interrupted either by thermostat 155 or by opening of switch 127 in response to suction pressure. During the time that the compressor motor is operating the heater 154 opens the element 144 maintaining the finger 151 out of engagement with the stem 128.

Under some circumstances it may be desirable to operate the compressor motor solely from the thermostat 155 with the controller 125 acting only as a low pressure cutout requiring manual reset. To provide for this type of operation the switch 127 is manually closed and the screw 142 is screwed downwardly far enough so that the lever 129 is prevented from being raised high enough to engage the cam 130 and cause closure of switch 127 in response to suction pressure. Under these circumstances the switch 127 normally remains closed and the compressor is started and stopped in response to the thermostat 155 alone, the thermostat 155 normally becoming satisfied and stopping the compressor motor before the switch 127 is opened in response to falling suction pressure. However, with this type of operation, if the suction pressure does fall to the relatively low value determined by the setting of the cam 131, the lever 129 will be actuated to open the switch 127 and stop the compressor motor. If this occurs, the switch 127 will remain open until it is manually reclosed, since screw 142 prevents upward movement of lever 129. It is to be seen therefore that with screw 142 adjusted as described above for this type of operation, the controller 125 acts as a low pressure cut-out requiring manual reset.

When the ambient temperature surrounding the compressor falls into the range between 35° F. and 50° F., the suction pressure will not rise high enough to cause closure of switch 127 for normal operation. Under these circumstances at a predetermined ambient temperature, the device 145 will cause finger 151 to engage the stem 128 and close switch 127 as above described. When the switch 127 is thus closed, if thermostat 155 is calling for refrigeration at the time, the above described circuit for heater 154 and compressor motor 11 will be completed. When the compressor is thus started, heat either from the compressor itself, or from the condenser if the controller 125 is mounted as shown in Figures 3 to 5, or heat from the heater 154 if it is used, will cause the element 144 to move the finger 151 away from the stem 128. As described above, after the compressor motor has stopped, substantially an hour will be required for the controller 125 to dissipate its accumulated heat after which element 144 will again respond normally to ambient temperature.

From the foregoing, it is to be understood that the present embodiment of the invention provides for substantially the same type and sequence of operation as obtained in the previous embodiment, the present embodiment utilizing a different form of controller.

Referring to Figure 6 of the drawings, I have shown a modified form of my invention embodied in a system, the system being the same as that shown in Figures 1 and 2 having its elements numbered the same.

The system of Figure 6 is controlled by a controller 165 which is like the controller of Figure 2 in many respects but having some additional features. Those elements of the controller 165 which are identical with corresponding elements of the controller 125 of Figure 2 are numbered the same. In Figure 6 the ambient temperature responsive device comprises a bimetal element 166, the inner end of which is rigidly secured to the casing of the controller 165 and the other end of which is adapted to engage operating stem 128 of the snap switch 127 and to close the switch when the temperature within the casing of controller 165 falls to a predetermined value within a range in this modification of the invention of from 55° F. to 70° F. This temperature range within the casing of the controller corresponds to an ambient temperature range around the compressor of from 35° F. to 50° F. as will presently be explained.

The controller 165 includes an electromagnetic device designated generally at 167, this device being controlled by the thermostat 99 in the refrigerated compartment, this thermostat being the same as that of Figure 1 but having an electric heater 168 associated therewith, the purpose of which will presently be described. In the controller 165 the switch 127 is supported on a shelf 169 which has an angular bracket portion, as shown, which carries and supports an electrical winding 170 forming part of the electromagnetic device 167. Within the winding 170 is a core 171 which cooperates with an armature 172 in the form of a lever which is pivoted to the bracket portion of the shelf 169 and which is normally biased in a clockwise direction by a coil spring 173 which is attached to the left end of lever 172 and to the bracket portion of shelf 169. When the winding 170 is not energized the spring 173 urges the lever 172 in a clockwise direction causing the right end of the lever 172 to engage the lever 129 so as to urge the latter lever downwardly in a manner to maintain the stem 128 in a downward position with the switch 127 open. With the parts of the controller 165 in the position shown in Figure 6, the suction pressure is normally inoperative to close the switch 127 by reason of the spring 173 and lever 172. However, with the parts in this position the suction pressure is effective to close the switch provided the suction pressure rises to a higher than normal value sufficient to overcome the force of spring 173, this higher than normal value of course depending upon the spring 173.

The winding 170 is normally connected to a power source in series with the electrical heating resistance 168. The circuit is as follows: from a line conductor 174 to wire 175, winding 170, wire 176, wire 177, electrical resistance 168, wire 178, wire 179 to line conductor 180, the line conductors 174 and 180 being connected to the power source. The circuit for winding 170 just described is not sufficient to cause the armature of the electromagnetic device to be attracted; it remains in the position shown. The circuit of winding 170 energizes it sufficiently to cause it to generate a certain amount of heat and this circuit through the electrical resistance 168 causes it to give off a certain amount of heat to heat the thermostat 99. The thermostat 99 in the present modification may have a differential of 2° F., for example; that is, it may close the mercury switch 102 at 42° F. and open it at 40° F. The resistance 168 may be such as to produce 3° of heat, for example; that is, it may raise the temperature in the refrigerated compartment locally around the thermostat 3° such that when the temperature within the refrigerated compartment is at 39° F. or above this value, with the mercury switch 102 open, the heat from resistance 168 will heat the thermostat sufficiently to cause it to close the mercury switch 102. When the mercury switch 102 closes, an additional circuit is completed for winding 170 which shunts the heater 168, this circuit being as follows: from line conductor 174, through wire 175, winding 170, wire 176, wire 181, mercury switch 102, wire 182, wire 179 back to line conductor 180. The latter circuit places winding 170 directly across the line. The latter circuit carries sufficient current so as to energize the electromagnetic device 167 sufficiently to cause its armature to be attracted, that is, the lever 172 is rotated in a counter-clockwise direction against the force of spring 173 and is held in its rotated position. With the parts so positioned, the lever 129 is not restrained from normal operation in response to suction pressure and the switch 127 may under these circumstances be closed in response to suction pressure at the normal cut-in pressure. When lever 172 has been moved away from lever 129, as soon as the suction pressure rises to the cut-in value, the switch 127 will be closed for starting the compressor and as in the previous embodiments the cut-in pressure is preferably high enough to insure that the evaporator has defrosted in the meantime. The circuit for the compressor is as follows: from line conductor 174 through wire 185, compressor motor 11, wire 186, switch 127 through wire 187 back to line conductor 180. When the compressor is started, the suction pressure is of course reduced and the operating cycle proceeds normally.

Operation of the system of course tends to reduce the temperature in the refrigerated compartment 19 and with the heater 168 not now energized the thermostat 99 will respond to the actual temperature in the refrigerated compartment, and whenever this temperature is reduced below 40° F., the thermostat 99 will open its switch 102 deenergizing the last described circuit for winding 170 and causing the original circuit through 168 to be reenergized. Interruption of the circuit through mercury switch 102 will cause the electromagnetic device 167 to assume the position shown in Figure 6, the lever 172 acting on lever 129 to open the switch 127 terminating the operating cycle. It is seen, therefore, that the operating cycle does not begin until the thermostat 99 is in a position calling for refrigeration and until the suction pressure rises to the cut-in value. After the compressor has been started the switch 127 will be opened to stop it whenever the thermostat 99 becomes satisfied or when the suction pressure falls to the cut-out value causing the stem 128 to be moved downwardly to open the switch 127. The switch can of course be opened by suction pressure irrespective of the device 167.

When the thermostat 99 becomes satisfied as above described, the heater 168 becomes reenergized so as to heat the thermostat to cause it to again assume unsatisfied position. In this manner it is to be seen that normally the thermostat 99 will cycle on and off by reason of heater 168 so as to cause the device 167 to intermittently permit closing of switch 127 in response to suction pressure. In the present form of the invention the thermostat 99 normally cycles on and off approximately every ten minutes. That is approximately ten minutes of operation of the compressor are required for switch 102 to open and the heater closes it in a half minute, for example. By reason of the cycling operation of thermostat 99, opportunities are provided at frequent intervals for the switch 127 to be closed in response to suction pressure, and after the compressor has been thus started its operation is not prolonged but it is terminated whenever the thermostat 99 becomes satisfied. Thus, the operation provides for relatively short and frequent cycles of the compressor which operation is desirable particularly under light load conditions to prevent the humidity within the refrigerated compartment from rising too high such as would occur if there were long off periods of the compressor. The more frequent compressor operations resulting from the use of the heater type thermostat prevents the occurrence of such long off periods of the compressor and thus the humidity is kept within a desired range.

The current flow through the winding 170 through the above described circuits causes the winding to generate a certain amount of heat which normally will maintain the temperature within the controller 165 at approximately 20° above the ambient temperature. It is for this reason that the element 166 is arranged to close the switch 127 at a temperature setting approximately 20° higher than the setting would be if the element 166 responded directly to the ambient temperature. When the ambient temperature is above the range of from 35° F. to 50° F., such that there is no need for closing the switch 127 by means of the element 166, the heat generated within the controller 165 keeps the free end of the element 166 disengaged from the stem 128. The element 166 expands in response to falling temperature and when the ambient temperature falls into the range just mentioned, that is, the range between 35° F. and 50° F. the free end of the element 166 will engage the operating stem 128 at a predetermined temperature within the casing of controller 165 and will close the switch 127 for starting the compressor. This operation is substantially the same as that described in connection with the previous embodiment. The temperature at which the switch 127 is closed by the element 166 will be substantially 20° higher than the ambient temperature as explained above. By reason of the frequent cycling of the thermostat 99 and the electromagnetic device 167, the temperature within the casing of controller 165 is normally maintained at substantially 20° above the ambient temperature as described, that is, winding 170 is practically continuously energized. Without the heater in combination with the thermostat 99 the device 167 would not be so frequently energized and the temperature within the casing of the controller 165 would not be as constant. Under such circumstances upon energization of the device 167 the temperature within the casing of controller 165 would rise to a value above normal and this rise in temperature would prevent the device 166 from closing the switch 127. Thus the heater type thermostat 99 cooperates with the control device 165 to enable the ambient thermostat 166 to start the compressor at the proper value of ambient temperature and to be otherwise disengaged from the operating stem 128 of the switch 127.

From the foregoing it will be apparent to those skilled in the art that in the present embodiment of the invention I have provided an arrangement wherein the compressor is started in response to suction pressure and in response to the thermostat in the refrigerated compartment and is stopped either when the temperature in the refrigerated compartment is reduced to a predetermined value or when the suction pressure falls to a predetermined value. As pointed out above, the arrangement provides for desirable cycling operation without prolonged operating periods which are particularly desirable when the load is not especially heavy.

Referring to Figure 7 of the drawings, I have shown another modified form of my invention comprising a controller which is essentially the same as that of Figure 2 but having means for compensating the cut-in and cut-out points of the switch in response to ambient temperature. The elements of the controller of Figure 7 are essentially identical with those of the controller of Figure 2 and they are numbered the same. The controller of Figure 7 however additionally includes a bowed bimetal element 190 responsive to ambient temperature. The lower end of the element 190 is attached to the inside of the casing of the controller and the other end has a curved portion, as shown, abutting the leaf spring 141, this portion being forked, with the stem 137 engaged between the prongs of the fork. The upper end of the element 190 tends to urge the lever 129 upwardly with a force depending upon the temperature affecting the element 190, the element 190 thus assisting upward movement of the stem 137 and causing the switch 127 to be closed at a lower value of suction pressure than if the controller were not compensated for ambient temperature. When the suction pressure is falling and the lever 129 is being moved downwardly by the stem 137 the element 190 resists such downward movement depending upon the temperature affecting the element 190 and thus makes it necessary for the suction pressure to fall to a lower than normal value in order for the switch 147 to be opened. The element 190 expands upon falling temperature and contracts upon rising temperature; that is, it warps in a direction to urge the lever 129 upwardly with greater force when the ambient temperature falls. The element 190 is so arranged that when the ambient temperature is above 50° F., it exerts negligible force upon the lever 129 so as to not affect the cut-in and cut-out points of the controller. When the ambient temperature falls into a range of from 35° F. to 50° F., such that the suction pressure may not normally rise high enough to cause closure of the switch 127, the element 190 effectively compensates the cut-in and cut-out points of the switch 127 as above described, the element lowering both the cut-in and cut-out points of the switch.

The embodiments of my invention which I have disclosed and described in detail are representative of its preferred forms. There are various modifications and variations which may be made in the invention but which fall within its spirit and scope. My disclosure is therefore to be interpreted in an illustrative rather than a limiting sense and the invention is to be limited only in accordance with the claims appended hereto.

I claim as my invention:

1. In a refrigerating system; a compressor; an evaporator; and control mechanism for controlling said compressor comprising a device movable between positions for starting and stopping the compressor, means responsive to a condition which is a measure of evaporator temperature for actuating said device, means responsive to temperature of the refrigerated space having on and off positions for moving said device to one of its positions when said temperature responsive means is in a given one of its positions, said temperature responsive means being arranged to resist movement of said device out of said one position as long as the temperature responsive means remains in said given one of its positions, and means arranged to change the temperature of said temperature responsive means when it assumes said given position so as to cause it to assume its other position.

2. In a refrigerating system; a compressor; an evaporator; and control mechanism for said system comprising a device movable between positions for starting and stopping the compressor, means responsive to a condition which is a measure of evaporator temperature for actuating said device, means responsive to temperature of the refrigerated space arranged to resist movement of said device out of off position for the compressor whenever said temperature responsive means is satisfied, and means to heat said temperature responsive means when satisfied so as to cause said latter means to assume an unsatisfied position wherein said device is not resisted from moving out of off position for the compressor whereby said temperature responsive means operates in a periodic cycling manner to periodically remove the resistance it offers to movement of said device to starting position for the compressor in response to said condition responsive means.

3. In a refrigerating system; a compressor; an evaporator; and control mechanism for said system comprising a device movable between positions for starting and stopping the compressor, means responsive to a condition which is a measure of evaporator temperature for actuating said device, means responsive to temperature of the refrigerated space having on and off positions for moving said device to one of its positions when said temperature responsive means is in a given one of its positions, said temperature responsive means being arranged to resist movement of said device out of said one position as long as the temperature responsive means remains in said given one of its positions, said temperature responsive means including means adapted to generate heat near said device, temperature responsive means arranged to be influenced by a relatively low temperature in the vicinity of the compressor for moving said device into starting position for the compressor, said last means being subjected to said aforementioned heat so to normally not operate said device.

4. In a refrigerating system; a compressor; an evaporator; and control mechanism for said system comprising a device movable between positions for starting and stopping the compressor, means responsive to a condition which is a measure of evaporator temperature for actuating said device, means responsive to temperature of the refrigerated space having on and off positions for moving said device to one of its positions when said temperature responsive means is in a given one of its positions, said temperature responsive means being arranged to resist movement of said device out of said one position as long as the temperature responsive means remains in said given one of its positions, said temperature responsive means including an electrical mechanism adapted to generate a substantial amount of heat near said device when the temperature responsive means is in its other position, means arranged to heat said temperature responsive means when it assumes said given position so as to cause it to cycle between its said positions more frequently than otherwise, whereby the said generated heat maintains a fairly uniform temperature above ambient temperature, temperature responsive means arranged to be influenced by a relatively low temperature in the vicinity of the compressor for moving said device into starting position for the compressor, said last temperature responsive means being so located as to be subjected to said generated heat whereby the device is normally not operated thereby unless the said relatively low temperature in the vicinity of the compressor is reached.

5. A refrigeration system comprising in combination, a compressor and evaporator, switch means in control of said compressor and located in the vicinity of said compressor, means transmitting pressure from the suction line of said refrigeration system to said switch for closing the same upon an increase in suction pressure, and means responsive to the temperature at said switch for decreasing the value of suction pressure at which said switch is closed upon a decrease in said temperature.

6. A refrigeration system comprising in combination, a compressor and evaporator, switch means in control of said compressor and located in the vicinity of said compressor, means transmitting pressure from the suction line of said refrigeration system to said switch for closing the same upon an increase in suction pressure, means responsive to the temperature at said switch for decreasing the value of suction pressure at which said switch is closed upon a decrease in said temperature, and means preventing closure of said switch except when there is a demand for refrigeration.

7. In a refrigerating system having a low pressure side and a high pressure side, in combination; a translating means for circulating refrigerant from said low pressure side to said high pressure side; and means for controlling the operation of said translating means including a unitary control mechanism, said control mechanism including means responsive to low side pressure, means operated by said pressure responsive means for normally deenergizing said translating means when said pressure is below a certain value, means emitting heat when said translating means is energized, and means responsive to the temperature of said mechanism as a whole for causing energization of said translating means when the temperature of said mechanism is below a predetermined value even though said pressure is below said certain value, said mechanism being so constructed that the heat from said emitting means raises the temperature of said mechanism as a whole above said predetermined value and thus renders ineffective said temperature responsive means, and so that the heat capacity of said mechanism as a whole is sufficient to maintain said temperature above said predetermined value for a period of time after deenergization of said translating means.

8. In a refrigerating system having a low pressure side and a high pressure side, in combination; a compressor for circulating refrigerant from said low pressure side to said high pressure side; and means for controlling the operation of said compressor including a unitary mechanism, said mechanism being located in proximity to said compressor and comprising means for controlling the energization of said compressor, means indicative of the pressure of said low pressure side for energizing said compressor when said pressure reaches a relatively high value, means emitting heat when said compressor is operating, said mechanism being capable of being warmed as a whole by said heat above a predetermined temperature value and having heat capacity, and means responsive to the temperature of said mechanism as a whole effective, when said temperature is below said predetermined value, to cause energization of said compressor although said pressure is below said relatively high value, said temperature responsive means being ineffective to influence energization of the compressor when the temperature of said mechanism is above said predetermined value.

9. In a refrigerating system having a suction pressure side and a high pressure side, in combination; a compressor for circulating refrigerant from said suction pressure side to said high pressure side; an electric motor for driving said compressor; an energizing circuit for said motor; and a unitary control mechanism, said mechanism including a relay for controlling said circuit, suction pressure responsive means, first and second switch means operated by said suction pressure responsive means, means responsive to the temperature of said mechanism as a whole, additional switch means operated by said temperature responsive means, an energizing circuit for said relay including said first and second switch means, said first switch means being operated when the suction pressure is above a relatively low value, said second switch means being operated when said suction pressure reaches a relatively high value, and a branch of the relay energizing circuit for making said additional switch means operative in parallel with said second switch means, said additional switch means being operated when the temperature of the mechanism as a whole is below a predetermined value, said relay emitting heat when energized, said mechanism having heat capacity such that, when warmed due to energizing of said relay, a period of time is required for the temperature of the mechanism to fall sufficiently, after deenergizing said relay, to again cause operation of said additional switch means.

10. A refrigerating system comprising, in combination: a refrigerant flow circuit having a high pressure side and a low pressure side; a compressor for pumping refrigerant from said low pressure side to said high pressure side; and a unitary control mechanism including switch means in control of said compressor, means responsive to pressure in said low pressure side for closing said switch means upon an increase in said pressure, means responsive to the temperature of said mechanism as a whole effective to decrease the value of low side pressure required to close said switch means when said temperature is below a predetermined value, said mechanism having heat capacity, and means for sufficiently heating said mechanism as a whole when said compressor is being operated to render said temperature responsive means ineffective to influence the pressure required to operate said switch means, said temperature responsive means remaining ineffective after operation of the compressor is stopped for the period of time required for said mechanism as a whole to cool below said predetermined temperature.

11. A refrigerating system comprising, in combination: a refrigerant flow circuit having a high pressure side and a low pressure side; a compressor for pumping refrigerant from said low pressure side to said high pressure side; an electric motor for driving said compressor; an electrical circuit for energizing said motor; a first switch for controlling the operation of said motor; and a control mechanism including a second switch for controlling said motor, said first and second switches being connected in series in said electrical circuit, said mechanism including a floating lever, means responsive to said low side pressure operatively connected to an intermediate portion of said lever, said second switch being operatively connected to a second portion of said lever whereby said switch may be operated by said lever, a pair of stops for limiting motion of a third portion of said lever, the values of low side pressure at which said second switch is opened and closed being determined by said stops, said mechanism also including temperature responsive means operating on said second switch means when the temperature of said mechanism as a whole is below a predetermined value in a manner to reduce the value of the low side pressure required to close said second switch, said temperature responsive means being ineffective to influence said second switch when the temperature of said mechanism as a whole is above said predetermined value, and means heating said mechanism during operating periods of said compressor, the heat absorbed by said mechanism being capable of maintaining said temperature responsive means ineffective for a period of time after said compressor stops, said period of time depending on the cooling time of said mechanism.

ALWIN B. NEWTON.